United States Patent
Segawa et al.

(10) Patent No.: US 9,619,001 B2
(45) Date of Patent: Apr. 11, 2017

(54) INFORMATION PROCESSING APPARATUS, DEVICE CONTROL METHOD AND COMPUTER PROGRAM PRODUCT FOR SAVING POWER

(71) Applicant: KABUSHIKI KAISHA TOSHIBA, Minato-ku, Tokyo (JP)

(72) Inventors: Junichi Segawa, Kawasaki (JP); Tatsunori Kanai, Yokohama (JP); Tetsuro Kimura, Tama (JP); Yusuke Shirota, Yokohama (JP); Shiyo Yoshimura, Kawasaki (JP); Masaya Tarui, Yokohama (JP); Hiroyoshi Haruki, Kawasaki (JP); Satoshi Shirai, Kawasaki (JP); Koichi Fujisaki, Kawasaki (JP); Akihiro Shibata, Inagi (JP); Haruhiko Toyama, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 348 days.

(21) Appl. No.: 14/190,378

(22) Filed: Feb. 26, 2014

(65) Prior Publication Data
US 2014/0245039 A1    Aug. 28, 2014

(30) Foreign Application Priority Data
Feb. 28, 2013    (JP) ................................. 2013-040176

(51) Int. Cl.
*G06F 1/00* (2006.01)
*G06F 1/26* (2006.01)
*G06F 1/32* (2006.01)

(52) U.S. Cl.
CPC ............ *G06F 1/3228* (2013.01); *G06F 1/324* (2013.01); *G06F 1/3237* (2013.01);
(Continued)

(58) Field of Classification Search
CPC ........................................................ G06F 1/32
See application file for complete search history.

(56) References Cited

U.S. PATENT DOCUMENTS

| | | | |
|---|---|---|---|
| 4,856,050 A | * | 8/1989 | Theis ................. H04M 3/5166 369/29.01 |
| 7,913,100 B2 | | 3/2011 | Songer et al. |

(Continued)

FOREIGN PATENT DOCUMENTS

| | | |
|---|---|---|
| CN | 102722233 | 10/2012 |
| JP | 09-081284 | 3/1997 |
| JP | 2012-063907 | 3/2012 |

OTHER PUBLICATIONS

Office Action for Taiwanese Patent Application No. 103105706 dated Sep. 11, 2015, 65 pages.
(Continued)

*Primary Examiner* — Mohammed Rehman
(74) *Attorney, Agent, or Firm* — Amin, Turocy & Watson LLP

(57) ABSTRACT

According to an embodiment, an information processing apparatus includes: a first control unit to control a first device; and a second control unit to control a second device. The first control unit includes a first request processing unit, a notification unit, and a first execution unit. The second request processing unit receives a second request including an instruction to start a process of the second device. The notification unit notifies the second control unit that the first control unit receives a first request. The second execution unit executes a second request received by the second request processing unit when the first device is in the active state, and executes the second request stored in the storage unit when the notification is received by the notification receiving unit.

18 Claims, 9 Drawing Sheets

(52) U.S. Cl.
CPC ........ *G06F 1/3287* (2013.01); *Y02B 60/1217* (2013.01); *Y02B 60/1221* (2013.01); *Y02B 60/1282* (2013.01)

(56) References Cited

U.S. PATENT DOCUMENTS

| | | | |
|---|---|---|---|
| 8,359,425 B2 | 1/2013 | Iwasaki et al. | |
| 8,832,335 B2 | 9/2014 | Shibata et al. | |
| 2004/0087839 A1* | 5/2004 | Raymond | A61B 5/002 600/300 |
| 2007/0094523 A1* | 4/2007 | Hsieh | G04G 9/00 713/300 |
| 2011/0119510 A1* | 5/2011 | Ahn | G06F 1/3203 713/323 |
| 2012/0246356 A1 | 9/2012 | Shibata et al. | |
| 2012/0246390 A1 | 9/2012 | Kanai et al. | |
| 2012/0246501 A1 | 9/2012 | Haruki et al. | |
| 2012/0246503 A1 | 9/2012 | Fujisaki et al. | |
| 2012/0246506 A1 | 9/2012 | Knight | |
| 2013/0059623 A1* | 3/2013 | Lindner | H04W 76/005 455/518 |
| 2013/0073812 A1 | 3/2013 | Kanai et al. | |
| 2013/0080812 A1 | 3/2013 | Shirota et al. | |
| 2013/0080813 A1 | 3/2013 | Tarui et al. | |
| 2013/0091372 A1 | 4/2013 | Kimura et al. | |
| 2013/0191670 A1 | 7/2013 | Haruki et al. | |
| 2013/0219203 A1 | 8/2013 | Fujisaki et al. | |
| 2013/0254773 A1 | 9/2013 | Kimura et al. | |
| 2013/0268781 A1 | 10/2013 | Kanai et al. | |
| 2014/0013138 A1 | 1/2014 | Kanai et al. | |
| 2014/0013140 A1 | 1/2014 | Segawa et al. | |
| 2014/0075227 A1 | 3/2014 | Shirota et al. | |
| 2014/0077604 A1 | 3/2014 | Shibata et al. | |
| 2014/0089715 A1 | 3/2014 | Kimura et al. | |
| 2014/0139500 A1 | 5/2014 | Kimura et al. | |
| 2014/0240333 A1 | 8/2014 | Shirota et al. | |
| 2014/0245045 A1 | 8/2014 | Haruki et al. | |
| 2014/0245047 A1 | 8/2014 | Yoshimura et al. | |

OTHER PUBLICATIONS

First Office Action for Chinese Patent Application No. 201410057361.X dated Feb. 2, 2016, 20 pages, with machine translation.

Japanese Office Action for Japanese Patent Application No. 2013-040176 mailed on Aug. 16, 2016. English Translation obtained from USPTO Global Dossier on Oct. 18, 2016. Dictionary last updated Oct. 17, 2016.

* cited by examiner

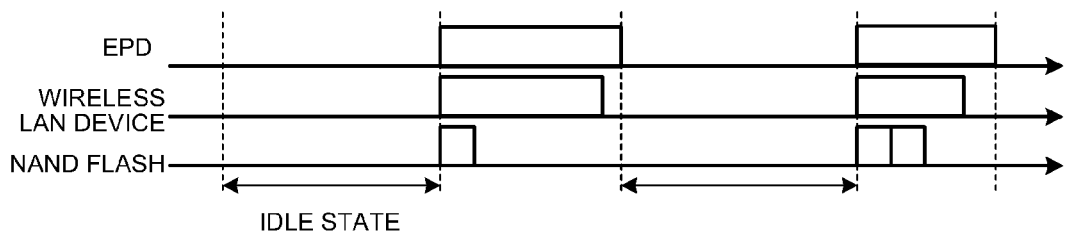
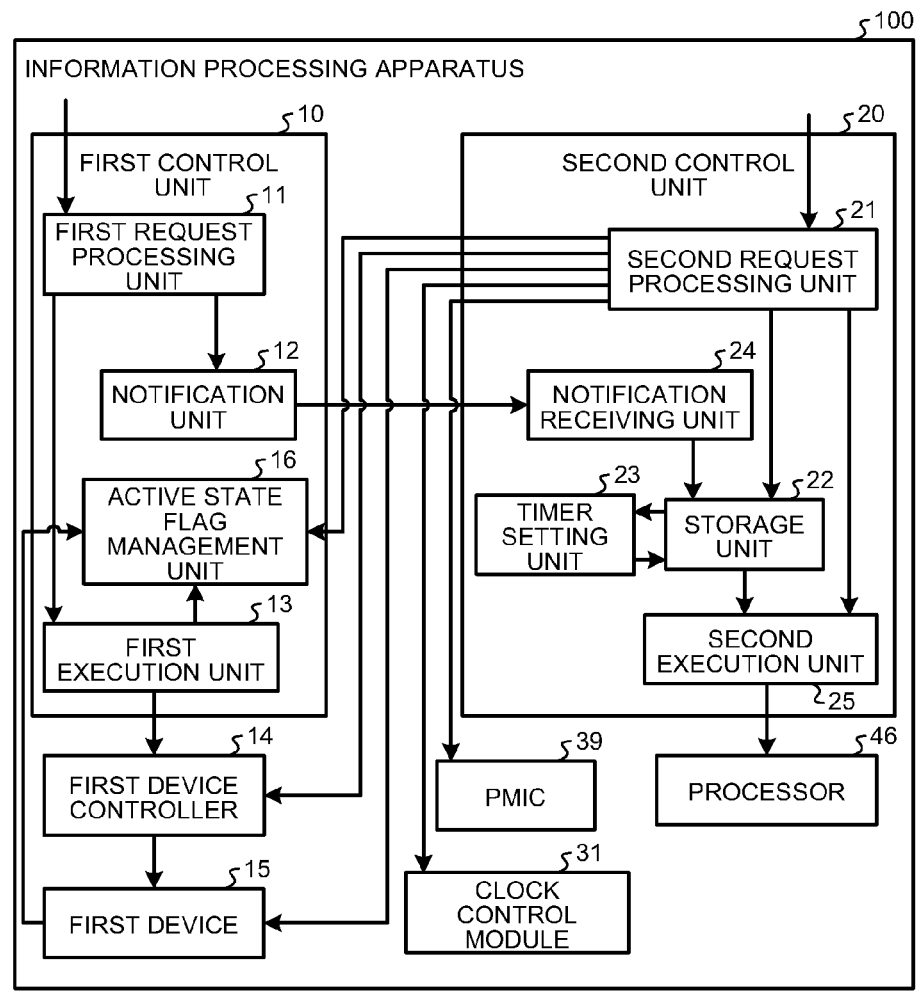

INFORMATION PROCESSING APPARATUS, DEVICE CONTROL METHOD AND COMPUTER PROGRAM PRODUCT FOR SAVING POWER

CROSS-REFERENCE TO RELATED APPLICATIONS

This application is based upon and claims the benefit of priority from Japanese Patent Application No. 2013-040176, filed on Feb. 28, 2013; the entire contents of which are incorporated herein by reference.

FIELD

Embodiments described herein relate generally to an information processing apparatus, a device control method, and a computer program product.

BACKGROUND

Appliances nowadays are installed with various devices, and thus, if the devices are controlled while taking power saving into account, the power consumption of the entire appliance may be reduced.

BRIEF DESCRIPTION OF THE DRAWINGS

FIG. 15 is a diagram illustrating an example of a device control method of the information processing apparatus of the fourth embodiment; and FIG. 16 is a diagram illustrating an example of a configuration of functional blocks of an information processing apparatus of an example modification of the first embodiment.

DETAILED DESCRIPTION

According to an embodiment, an information processing apparatus includes: a first control unit configured to control a first device and a second control unit configured to control a second device. The first control unit includes a first request processing unit, a notification unit, and a first execution unit. The first request processing unit is configured to receive a first request including an instruction to start a process of the first device. The notification unit is configured to notify the second control unit of reception of the first request. The first execution unit is configured to start a process of the first device based on the first request. The second control unit includes a second request processing unit, a storage unit, and a notification receiving unit, and a second execution unit. The second request processing unit is configured to receive a second request including an instruction to start a process of the second device. The storage unit is configured to store therein the second request in a case where the first device is not in an active state when the second request processing unit receives the second request. The notification receiving unit is configured to receive the notification. The second execution unit is configured to execute the second request received by the second request processing unit in a case where the first device is in the active state, and execute the second request stored in the storage unit when the notification is received by the notification receiving unit.

First Embodiment

Figure 1:
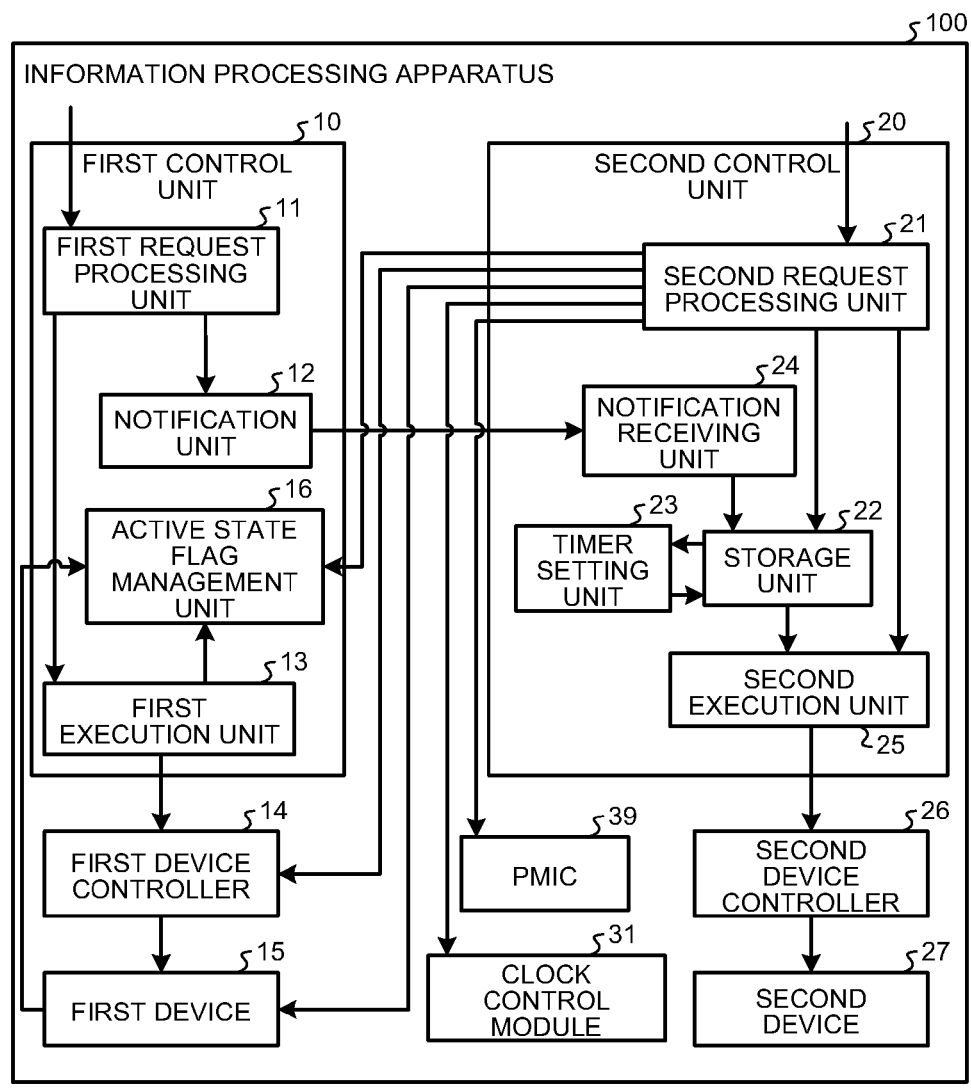
FIG. 1 is a diagram illustrating an example of a configuration of functional blocks of an information processing apparatus of a first embodiment.

FIG. 1 is a diagram illustrating an example of a configuration of functional blocks of an information processing apparatus 100 of a first embodiment. The information processing apparatus 100 of the present embodiment includes a first control unit 10, a first device controller 14, a first device 15, a second control unit 20, a second device controller 26, a second device 27, a PMIC 39, and a clock control module 31. The first control unit 10 includes a first request processing unit 11, a notification unit 12, an active state flag management unit 16, and a first execution unit 13. The second control unit 20 includes a second request processing unit 21, a storage unit 22, a timer setting unit 23, a notification receiving unit 24, and a second execution unit 25.

The first device 15 and the second device 27 are each one of devices configuring the information processing apparatus 100. The first device 15 and the second device 27 may be any devices.

The first request processing unit 11 receives a request including an instruction to start a process of the first device 15 (hereinafter, referred to as a "first request") from outside the first control unit. The first request is transmitted by an application or an operating system running on the information processing apparatus 100, a device driver or the like, for example. When the first request processing unit 11 receives the first request, the first request processing unit 11 issues a notification to the notification unit 12. When receiving the notification from the first request processing unit 11, the notification unit 12 notifies the second control unit 20 (the notification receiving unit 24) of reception of the first request. Further, when receiving the first request, the first request processing unit 11 transmits the first request to the first execution unit 13. The first execution unit 13 receives the first request and issues the instruction to start a process to the first device controller 14; and the first device controller 14 causes the first device 15 to start the process indicated by the first request. The active state flag management unit 16 is for managing a flag indicating whether the first device is in an active state or not. The first execution unit 13 issues a notification regarding execution start to the active state flag management unit 16 at the time when the first execution unit 13 transmits the instruction to start a process to the first device controller 14. In response to the notification, the active state flag management unit 16 turns on the flag to indicate that the first device is in the active state. Moreover, when the process of the first request is completed, the first device 15 issues a notification regarding completion of the process to the active state flag management unit 16, and the active state flag management unit 16 turns off the flag.

The second request processing unit 21 receives a request including an instruction to start a process of the second device 27 (hereinafter, referred to as a "second request") from outside the second control unit 20. The second request is transmitted by an application or an operating system running on the information processing apparatus 100, a device driver or the like, for example.

Figure 2:
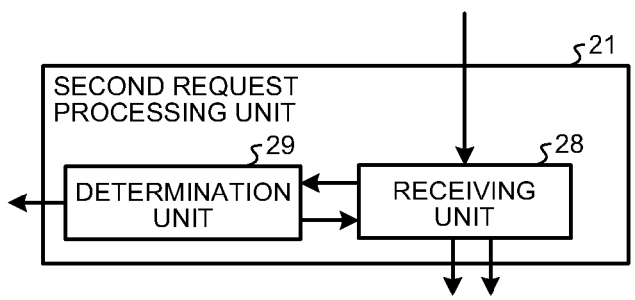
FIG. 2 is a diagram illustrating an example of a configuration of functional blocks of a second request processing unit of the first embodiment.

FIG. 2 is a diagram illustrating an example of a configuration of functional blocks of the second request processing unit 21 of the first embodiment. The second request processing unit 21 includes a receiving unit 28, and a determination unit 29. The receiving unit 28 receives the second request.

The receiving unit 28 of the second request processing unit 21 inquires of the determination unit 29 of the second request processing unit 21 whether the first device 15 is in the active state or not. That the first device 15 is in the active state indicates a case where the device is executing a process. Specifically, there are a case where a clock is transmitted to the first device 15, a case where a status register of the first device 15 or of the first device controller 14 indicates ON, a case where the PMIC 39 is supplying power to the first device 15, and a case where a flag of the active state flag management unit 16 of the first control unit 10 is indicating the active state, for example. When receiving the inquiry about whether the first device 15 is in the active state or not from the receiving unit 28, the determination unit 29 determines whether the first device 15 is in the active state or not. The determination method can be used any method as follows: a method, performed by the determination unit to check whether a clock is transmitted to the first device 15, of referring to a register indicating whether a clock is being supplied to the first device in the clock control module 31; a method of referring to a status register, included in the first device 15 or the first device controller 14, indicating whether the state is the active state; a method of referring to a register, included in the PMIC 39, indicating whether power is being supplied to the first device 15; and a method of referring to a flag, managed by the active state flag management unit 16 of the first control unit 10, indicating whether the state is the active state. Using such determination methods either alone or in combination, the determination about whether the first device 15 is in an active state is made.

In the case where the first device 15 is determined by the determination unit 29 to be not in the active state, the second request processing unit 21 transmits the second request to the storage unit 22, and the storage unit 22 stores the second request in association with an ID for identifying the second request. The storage unit 22 includes a queue inside so as to be able to store a plurality of second requests in chronological order. At the time of storing the second request in the storage unit 22, a timer is set in the timer setting unit 23 together with the ID for identifying the second request so that an operation of taking out the second request stored in the storage unit 22 and transmitting the same to the second execution unit is performed, so as to prevent the second request from being stored in the storage unit for a predetermined period or longer and from not being performed. When the time set in the timer is elapsed, the timer setting unit 23 transmits the ID for identifying the second request to the storage unit 22, and in the case where the second request corresponding to the ID is in the storage unit, the storage unit 22 transmits the second request to the second execution unit. Further, in the case where the first device 15 is determined by the determination unit 29 to be in the active state, the receiving unit 28 of the second request processing unit 21 transmits the second request to the second execution unit 25. The second execution unit 25 receives the second request, and transmits an instruction to start a process to the second device controller 26, and the second device controller 26, which has received the instruction, causes the second device 27 to start the process indicated by the second request.

The notification receiving unit 24 receives the notification indicating that the first request is received, from the notification unit 12. When receiving the notification, the notification receiving unit 24 notifies the storage unit 22 of the same. When receiving the notification, the storage unit 22 transmits the second request which is stored to the second execution unit, and the second execution unit 25 receives the second request and transmits an instruction to start a process to the second device controller 26, and the second device controller 26, which has received the instruction, causes the second device 27 to start the process indicated by the second request.

The first control unit 10 and the second control unit 20 are implemented by execution of programs. The programs of the first control unit 10 and the second control unit 20 may be implemented by parts of the programs of the operating system and the device driver, of the operating system and the application, of the device driver and the application, or of the operating system, the device driver and the application. Control of starting the operation of the second device 27 may be performed by the first control unit 10 and the second control unit 20, in the case where the first device 15 is in the active state.

Figure 3:
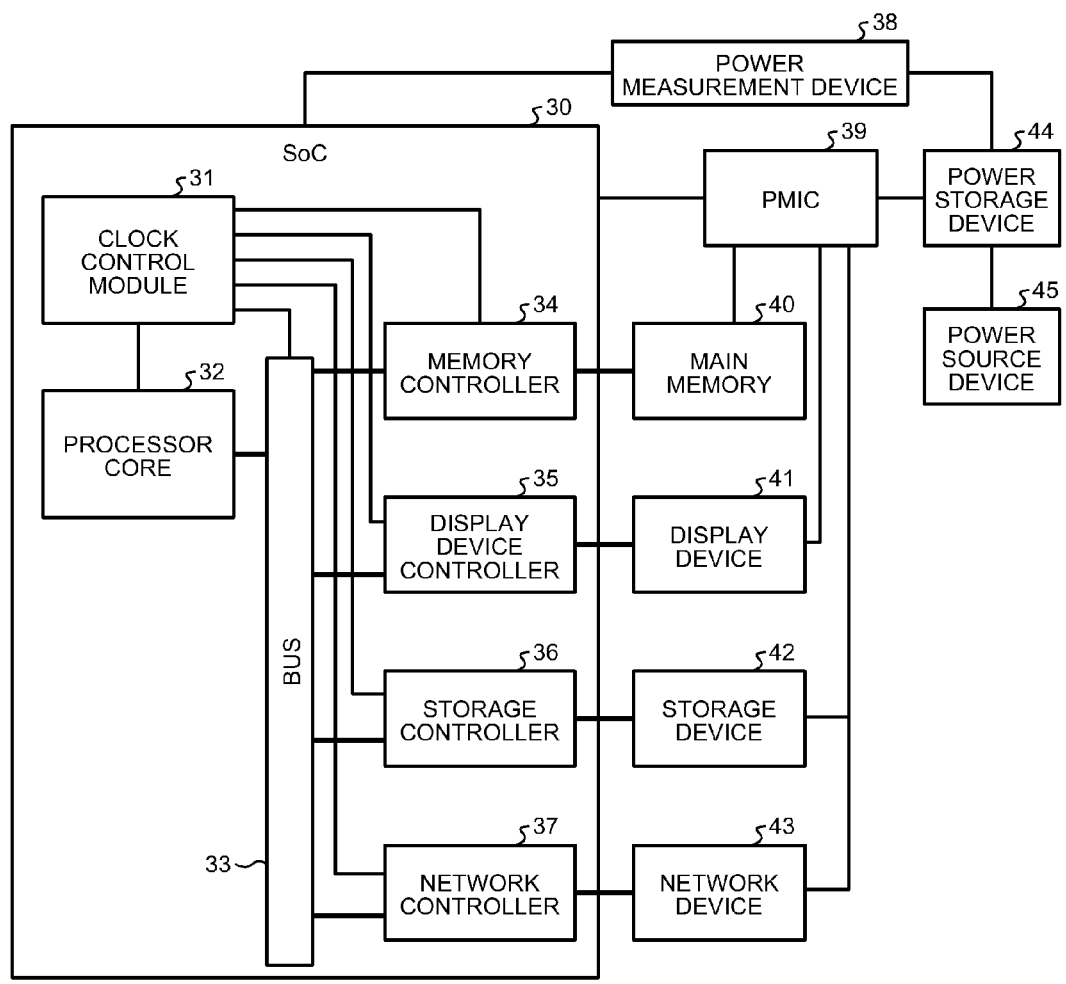
FIG. 3 is a diagram illustrating an example of a hardware configuration of the information processing apparatus of the first embodiment.

FIG. 3 is a diagram illustrating an example of a hardware configuration of the information processing apparatus 100 of the first embodiment. The information processing apparatus 100 of the present embodiment includes an SoC 30 (System on a chip), a power measurement device 38, a PMIC 39 (Power Management Integrated Circuit), a main memory 40, a display device 41, a storage device 42, a network device 43, a power storage device 44, and a power source device 45. Additionally, although not illustrated in FIG. 3, the information processing apparatus 100 may further includes various devices such as a keyboard, a touch panel and the like.

The SoC 30 includes a clock control module 31, a processor core 32, a bus 33, a memory controller 34, a display device controller 35, a storage controller 36, and a network controller 37. Additionally, the memory controller 34, the display device controller 35, the storage controller 36, and the network controller 37 may be outside the SoC 30.

Here, concrete examples of the first device 15 and the second device 27 of the information processing apparatus 100 of the present embodiment will be described. For example, with respect to the information processing apparatus 100 of the present embodiment, in the case where the network device 43 is a wireless LAN device, the storage device 42 is a NAND flash, and the display device 41 is a liquid crystal display, the first device 15 may be a wireless LAN, and the second device 27 may be the NAND flash. To coincide the timings of the devices being placed in the active state, a method is desirable of deciding the first device 15 to be the reference and, during a period when the device which is the reference is in the active state, causing another device to be the second device 27 and coinciding the timings of being placed in the active state. When comparing the average times of the active state, the time of the wireless LAN device being in the active state is longer compared to the NAND flash. Further, among the processes using the NAND flash, the writing of the NAND flash is a write process for a page cache on the main memory 40, and a slight delay in the timing does not become a problem. Further, in the case where the main memory 40 is non-volatile, the page cache on the main memory 40 is not lost even when the power is out, and the possibility of occurrence of a problem due to a delay in the writing is further reduced.

Accordingly, with respect to the information processing apparatus 100 of the present embodiment, in the case where the network device 43 is a wireless LAN, the storage device 42 is a NAND flash, and the display device 41 is a liquid crystal display, and the liquid crystal display is turned off, it is desirable to cause the wireless LAN device to be the first device 15 and the NAND flash to be the second device 27, and to coincide the active state of the NAND flash with the active state of the wireless LAN. However, the device to be the reference is not restricted to the wireless LAN device.

On the other hand, for example, in the case where the information processing apparatus 100 is an electronic book terminal where an EPD is used as the display device 41, the EPD stays in the active, state longer than the wireless LAN and the NAND flash. Accordingly, the EPD is desirable to be the first device 15 as the reference, and the wireless LAN or the NAND flash to be the second device 27. Alternatively, the EPD may be the first device 15, and both the wireless LAN and the NAND flash may be the second device 27. At this time, the process of the wireless LAN device, in addition to the NAND flash, is made to coincide with the active state of the EPD and the start of the process is delayed, but since network processing is due to be delayed, this is hardly a problem. Additionally, a case where there are a plurality of second devices 27 will be described with reference to an information processing apparatus 100 of a fourth embodiment.

Moreover, in the case where the display device 41 is a device other than the EPD and the network is configured only from neighboring nodes, and use in the network where response of network processing is extremely fast is assumed, there may be no big difference in the active state time length between the wireless LAN device and the NAND flash. In this case, both the wireless LAN device and the NAND flash may be the first device 15, and other devices may be the second device 27. A case where there are a plurality of first devices 15 will be described with reference to an information processing apparatus 100 of a third embodiment.

Next, an example of a method of causing a device configuring the information processing apparatus 100 of the present embodiment to operate as the first device 15 or the second device 27 will be described. For example, a method of causing the first device 15 to be the display device 41, and the second device 27 to be the storage device 42 will be described. In the case of causing the display device 41 to be the device which is the reference (the first device 15), and coinciding the timing of the write process of the storage device 42 when the display device 41 is in the active state, the first control unit 10 is embedded in the device driver of the display device 41, for example. That is, the driver of a conventional display device 41 receives a request by the first request processing unit 11 and execution of an operation indicated by the first request is started by the first execution unit 13, but with the information processing apparatus 100 of the present embodiment, the notification unit 12 is embedded between the first request processing unit 11 and the first execution unit 13. On the other hand, the second control unit 20 is embedded in the device driver of the storage device 42. That is, the storage unit 22, the timer setting unit 23 and the notification receiving unit 24 are newly embedded in addition to the second request processing unit 21 and the second execution unit 25 of the device driver of a conventional storage device 42. Further, the determination unit 29 is embedded in the second request processing unit 21.

Moreover, as another example, the process of writing the page cache on the main memory 40 to the storage device 42 may be coincided with the active state of the display device 41 by embedding the second control unit 20 in the operating system, for example. That is, a write request for the page cache is received inside the operating system, and the second control unit 20 is embedded at a portion where writing of the page cache is performed in the storage device 42.

Next, details of each piece of hardware of the hardware configuration of the information processing apparatus 100 of the present embodiment will be given.

The clock control module 31 supplies clocks to the processor core 32, the bus 33, the memory controller 34, the display device controller 35, the storage controller 36, and the network controller 37. In the case of supplying clocks also to the main memory 40, the display device 41, the storage device 42, and the network device 43, the clocks are supplied by respective controllers (the memory controller 34, the display device controller 35, the storage controller 36, and the network controller 37) or directly from the clock control module 31.

The clock control module 31 supplies clocks to the device in the active state, the main memory 40, the bus 33 and the like in the case where devices such as the main memory 40, the display device 41, the storage device 42, the network device 43 and the like are in the active state. If there is even one device that is operating (in the active state) in the information processing apparatus 100, the clock control module 31 does not stop supplying the clocks. The information processing apparatus 100 (or the SoC 30) of the present embodiment may adopt a plurality of power saving modes, and the clock control module 31 may be stopped in an idle state where power consumption can be reduced the most. Accordingly, if there is even one device that is in the active state, the information processing apparatus 100 (or the SoC 30) is not allowed to place the operation state in the idle state.

The processor core 32 controls the operation of the information processing apparatus 100 by executing programs of the operating system, the application or the like. The bus 33 is a transmission path for transmitting/receiving data between devices of the information processing apparatus 100. The PMIC 39 includes a plurality of power rails (power lines) for supplying power to each of the devices configuring the information processing apparatus 100. The PMIC 39 can supply a different voltage for each power rail (power line). The PMIC 39 converts the voltage supplied by the power storage device 44 to a voltage required by each device, and then supplies the same to each device. The PMIC 39 may change the voltage or stop power supply for each power rail (power line). In the case where the same number of power rails (power lines) as the devices cannot be provided, for example, one power rail (power line) may be shared by a plurality of devices. For example, with the information processing apparatus 100 of the present embodiment, the power rail (the power line) for supplying power to the storage device 42 and the network device 43 is shared. However, in the case of sharing a power rail (a power line) by a plurality of devices, power is simultaneously supplied to devices other than the one in the active state even when it is enough if power is supplied only to the device in the active state, and power may be consumed needlessly.

The main memory 40 may be a volatile memory or a non-volatile memory. For example, if volatile, the main memory 40 may be a DRAM (Dynamic Random Access Memory), or an SRAM (Static Random Access Memory). Further, if non-volatile, the main memory 40 is an MRAM (Magnetoresistive Random Access Memory), a PCM (Phase Change Memory), a ReRAM (Resistance Random Access Memory), a FeRAM (Ferroelectric Random Access Memory), an NOR flash memory, or the like.

The main memory 40 is controlled by the memory controller 34. Clocks necessary for the operation of the main memory 40 are supplied by the memory controller 34. When there is no access from the processor core 32 or the controller of another device, the main memory 40 may shift to a self-refresh mode or the like with lower power consumption to thereby reduce power consumption. In the case where the main memory 40 is a non-volatile memory, data may be maintained without power. Accordingly, in this case, the power consumption may be further reduced by the PMIC 39 cutting off power supply to the main memory 40.

Moreover, in many cases, the display device 41, the storage device 42, and the network device 43 access the main memory 40 when in the active state. Accordingly, the information processing apparatus 100 of the present embodiment allows access to the main memory 40 when any one of the display device 41, the storage device 42, and the network device 43 is in the active state. The main memory 40 may reduce power consumption by switching into a power saving mode such as the self-refresh mode or, in the case of the non-volatile memory, by turning off the power. However, when in the self-refresh mode or when the power is off, the memory cannot be accessed from outside. Thus, when there is a device in the active state which may access the main memory 40, the memory controller 34 is not allowed to reduce power consumption of the main memory by placing the main memory 40 in the self-refresh mode or by stopping power supply.

The display device 41 may be a liquid crystal display, a PSR (Panel Self Refresh) liquid crystal display, an EPD (Electrophoretic Display) or the like. With respect to the liquid crystal display, power and clocks have to be supplied to the device and the controller during display. With respect to the memory liquid crystal display, power has to be supplied to the device during display, but clocks for the controller may be stopped if display content is not rewritten. The EPD requires clocks and power at the time of rewriting, but at times other than the rewriting, the drawn content may be maintained without power. Generally, time required for rewriting is longer for the EPD than the liquid crystal display or the like, and thus, the EPD tends to be used for an electronic reader according to which reduction in the power consumption is prioritized than the drawing speed. The EPD is controlled by the display device controller 35. In the case where the EPD is in the active state to perform a drawing process, the display device controller 35 supplies clocks to the EPD. Further, if the EPD is in the active state, the main memory 40 is also in the active state. This is for allowing the display device controller 35 to transfer data of the drawn content developed on the main memory 40 to the EPD, or to calculate the parameter for voltage control for the EPD based on the data of the drawn content by using the main memory 40, for example.

The storage device 42 is used as a secondary storage. The storage device 42 may be a NAND flash, an NOR flash, various types of memory card such as an SD card, a hard disk or the like, for example. With the information processing apparatus 100 of the present embodiment, a description is given assuming that the storage device 42 is a NAND flash. The storage device 42 is not restricted to the NAND flash, and it may be any storage device. The NAND flash stores data such as files and programs. The NAND flash is controlled by the storage controller 36. The storage controller 36 supplies clocks when the NAND flash is in the active state to perform a read/write process. In the case of reading data on the NAND flash, the storage controller 36 develops this data on the main memory 40 as a page cache. In the case where an application, the OS or the like is to rewrite data, the page cache on the main memory 40 is changed. This page cache is regularly written to the NAND flash by the storage controller 36. Accordingly, when reading/writing of data with respect to the NAND flash occurs, the main memory 40 is also placed in the active state.

The network device 43 may be a wired LAN device, a wireless LAN device conforming to transmission standards such as 802.11a/802.11b/802.11g/802.11n/802.11ac, Bluetooth (registered trademark), ZigBee, TransferJet or the like, for example. With the information processing apparatus 100 of the present embodiment, a description is given assuming that the network device 43 is a wireless LAN device. Additionally, the network device 43 is not restricted to the wireless LAN device, and it may be any network device. The wireless LAN device is controlled by the network controller 37. The network controller 37 supplies clocks when the wireless LAN device is in the active state to perform a network process. Since, when in the active state, the wireless LAN device reads/writes data to be transmitted/received using the main memory 40, the main memory 40 is also placed in the active state.

The power source device 45 may be an AC power source such as an AC adapter, or various power generation devices such as an energy harvesting device, for example. The energy harvesting device is a solar cell that uses light energy, or a device that uses an energy harvesting technology that uses thermal energy or the like. With the information processing apparatus 100 of the present embodiment, a description is given assuming that the power source device 45 is an energy harvesting device, but the power source device 45 is not restricted to the energy harvesting device. In the case of using the energy harvesting device as the power source device 45, power generated only by the power source device 45 is not enough to obtain power at the peak time of the operation of the information processing apparatus 100. Thus, surplus power is stored in the power storage device 44 while the power consumption is low, so as to meet the power for the peak time. The power storage device 44 is a large-capacitance capacitor such as an electric double-layer capacitor or a lithium ion capacitor, or a battery such as a lithium ion battery. The power storage device 44 may also be a device combining both the large-capacitance capacitor and the battery.

The power measurement device 38 is a device for measuring the amount of power stored in the power storage device 44. For example, in the case where the power storage device 44 is a capacitor such as the electric double-layer capacitor or the lithium ion capacitor, the amount of stored power may be obtained by measuring the output voltage. Thus, an AD converter may be used as the power measurement device 38. Further, in the case where the power storage device 44 is the lithium ion battery or the like, a coulomb counter may be used as the power measurement device 38. That is, the amount of stored power may be obtained by measuring the amount of charge/discharge of the battery by the coulomb counter.

Next, device control methods of the first control unit 10 and the second control unit 20 of the information processing apparatus 100 of the present embodiment will be described.

Figure 4:
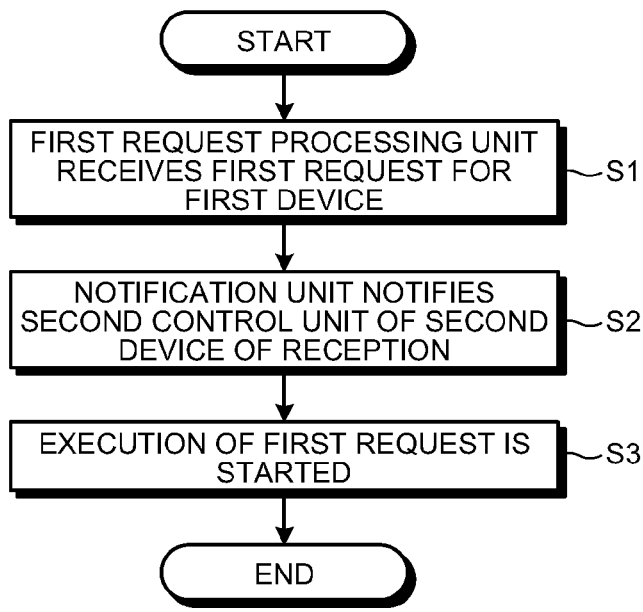
FIG. 4 is a flow chart illustrating an example of an operation of a first control unit of the first embodiment.

FIG. 4 is a flow chart for describing an example of an operation of the first control unit 10 of the information processing apparatus 100 of the first embodiment. The first request processing unit 11 receives a first request including an instruction to start a process of the first device 15 (step S1). The notification unit 12 notifies the second control unit 20 of reception of the first request (step S2). The first execution unit 13 issues an instruction to the first device controller such that the first device may start execution of the first request (an operation indicated by the first request), and the first device controller causes the first device to start execution of the process (step S3).

Figure 5:
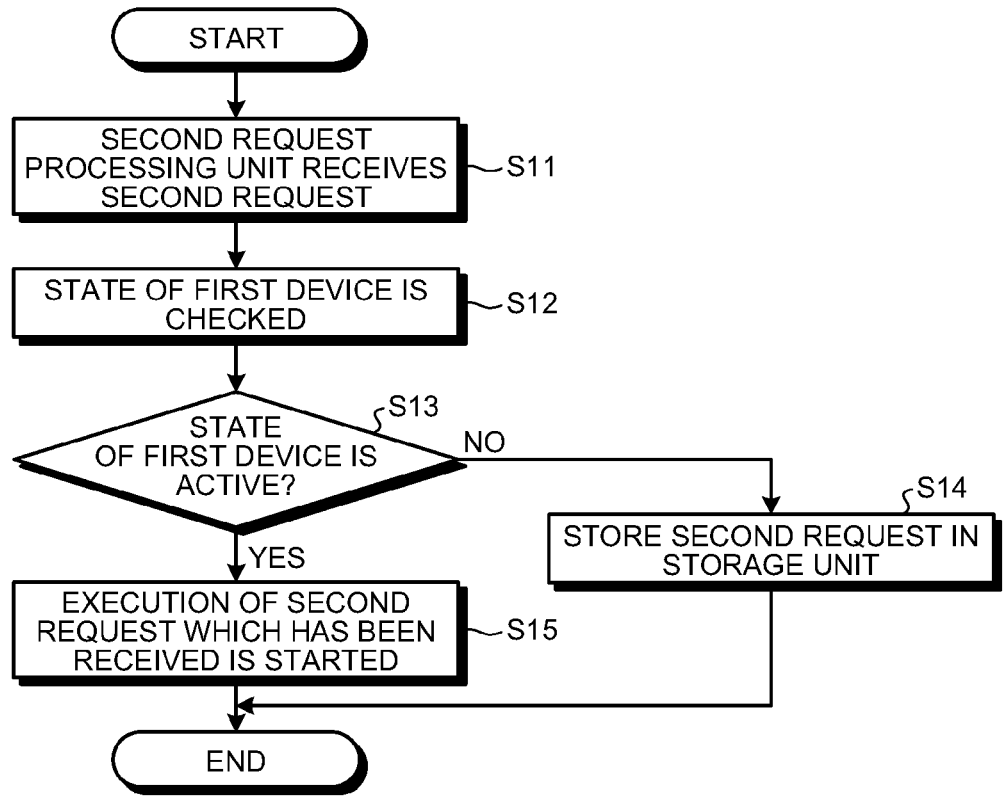
FIG. 5 is a flow chart illustrating an example of an operation of a second control unit of the first embodiment.

FIG. 5 is a flow chart for describing an example of an operation of the second control unit 20 of information processing apparatus 100 of the first embodiment. The second request processing unit 21 receives a second request including an instruction to start a process of the second device 27 (step S11). The second request processing unit 21 (the determination unit 29) checks whether the first device 15 is operating (is in the active state) (step S12). The second request processing unit 21 (the determination unit 29) determines whether the first device 15 is operating (is in the active state) (step S13). In the case where the first device 15 is not in the active state (step S13: No), the storage unit 22 stores the second request (step S14). In the case where the first device 15 is in the active state (Step S13: Yes), the second execution unit 25 issues an instruction to the second device controller such that the second device may start execution of the second request (an operation indicated by the second request), and the second device controller causes the second device to start execution of the process (step S15).

Figure 6:
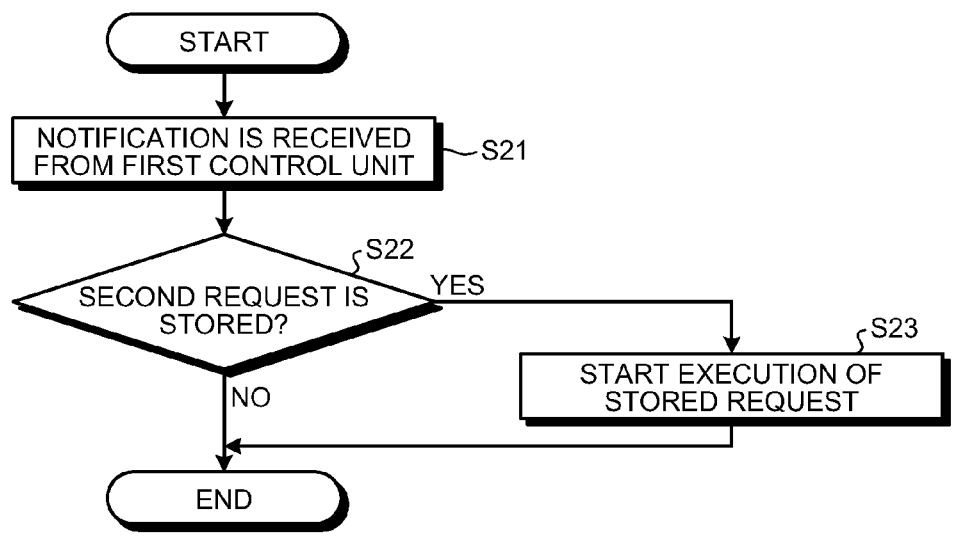
FIG. 6 is a flow chart illustrating an example of an operation at the time of a notification receiving unit of the first embodiment receiving a notification.

FIG. 6 is a flow chart illustrating an example of an operation at the time of the notification receiving unit 24 of the information processing apparatus 100 of the first embodiment receiving a notification. The notification receiving unit 24 receives a notification indicating that the first request is received, from the notification unit 12 of the first control unit 10 (step S21). The second execution unit 25 checks whether the second request is stored in the storage unit 22 (step S22). In the case where the second request is stored (step S22: Yes), execution of the second request stored in the storage unit 22 is started (step S23). In the case where the second request is not stored (step S22: No), the process is ended.

The process of the flow chart of FIG. 6 is not performed in the case where the first request is not received by the first device 15. Accordingly, the process of the flow chart of FIG. 6 (steps S22 and S23) is also performed with the expiry of the timer set by the timer setting unit 23 as the trigger. Generally, an operating system is provided with a timer function of causing a specified process to be performed after a predetermined period of time has elapsed or on a regular basis. Thus, a timer interrupt may be performed also by using the timer function of the operating system. For example, the timer interrupt may be performed by the timer setting unit 23 setting the timer at the time of storing the second request, or by causing the process of the flow chart of FIG. 6 (steps S22 and S23) to be activated periodically and at predetermined intervals at the time of activation of the operating system.

Next, an effect of the device control method of the information processing apparatus 100 of the present embodiment will be described.

Figure 7:
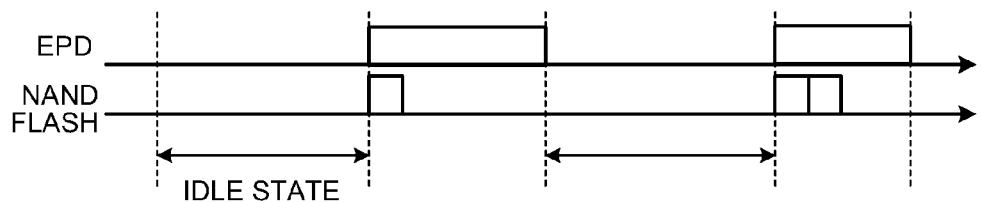
FIG. 7 is a diagram illustrating an example of a device control method of the first embodiment (an EPD and a NAND flash)
Figure 8:
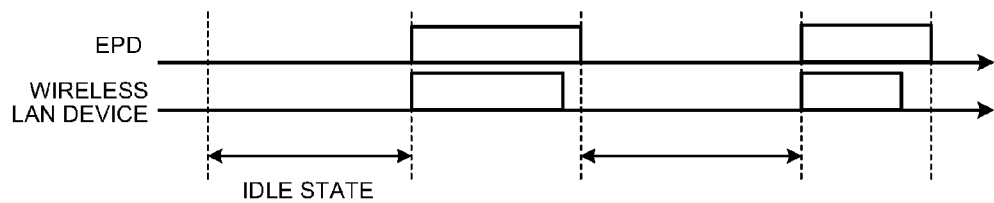
FIG. 8 is a diagram illustrating an example of the device control method of the first embodiment (an EPD and a wireless LAN device)

FIG. 7 is a diagram illustrating an example of the device control method of the information processing apparatus 100 of the first embodiment (an EPD and a NAND flash). The information processing apparatus 100 of the present embodiment (in the case of the concrete example in FIG. 7), starts the operation of the second device 27 (the NAND flash) in the case where the first device 15 (the EPD) is in the active state. FIG. 8 is a diagram illustrating an example of the device control method of the information processing apparatus 100 of the first embodiment (an EPD and a wireless LAN device). The information processing apparatus 100 of the present embodiment (in the case of the concrete example in FIG. 8) starts the operation of the second device 27 (the wireless LAN device) in the case where the first device 15 (the EPD) is in the active state. The idle state may thereby be made longer compared to the case of a conventional information processing apparatus 100, and power saving may be achieved for the information processing apparatus 100. That is, the time when the SoC 30 may stay in the idle state with low power consumption or when the main memory 40 may be placed in the power saving mode or in a power off state may be made longer. Further, the time of supplying power to a device by the PMIC 39 may be made shorter.

Second Embodiment

Next, an information processing apparatus 100 of a second embodiment will be described. The information processing apparatus 100 of the first embodiment aims to achieve power saving by shifting the timing of start of execution of a process indicated by a second request from the reception of the second request by the second device 27. However, a time difference occurs between the reception of the request and the timing of start of execution, and in the case where there is sufficient power, it is desirable that there is no time difference. According to the information processing apparatus 100 of the present embodiment, a power monitoring unit 17 is provided to a second control unit 20, and the timings of devices being placed in the active state are coincided only when the amount of stored power is less than a threshold.

Figure 9:
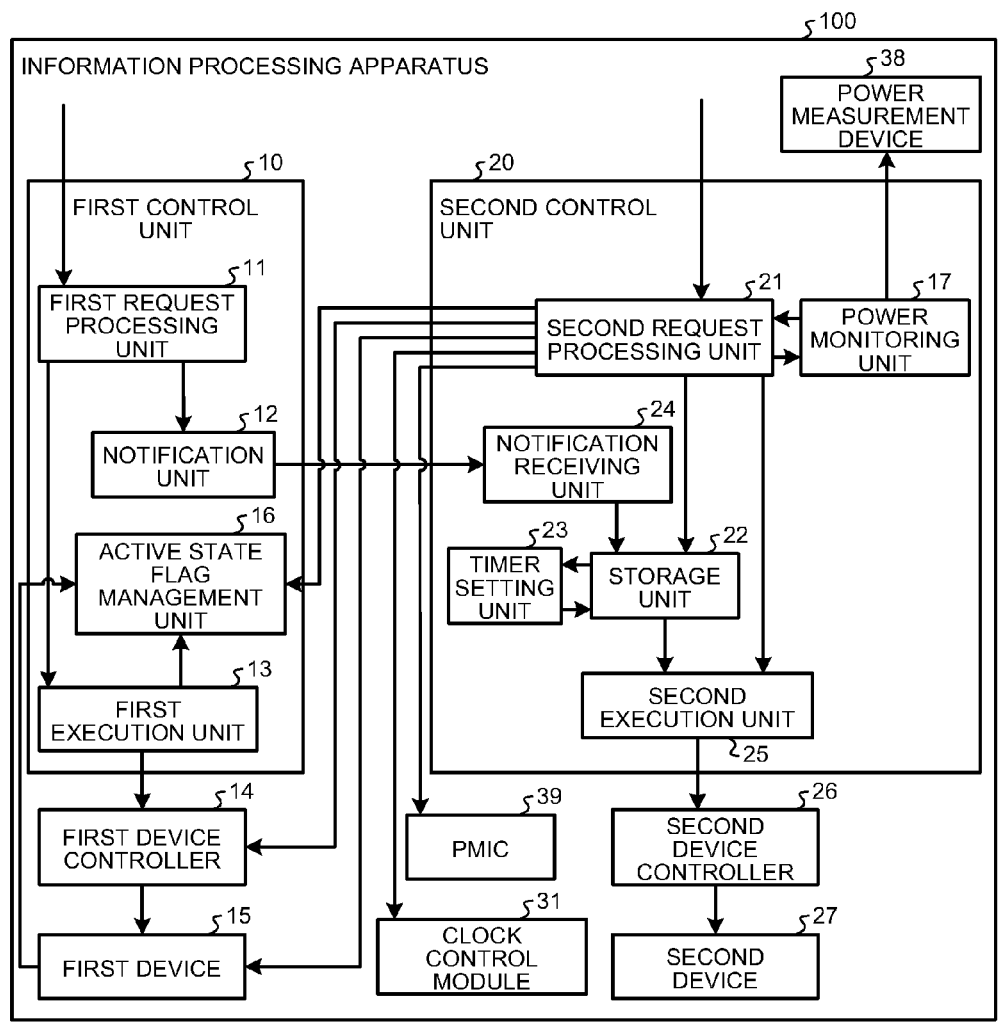
FIG. 9 is a diagram illustrating an example of functional blocks of an information processing apparatus of a second embodiment.

FIG. 9 is a diagram illustrating an example of functional blocks of the information processing apparatus 100 of the second embodiment. The information processing apparatus 100 of the present embodiment includes a first control unit 10, a first device controller 14, a first device 15, a second control unit 20, a second device controller 26, a second device 27, a PMIC 39, a clock control module 31, and a power measurement device 38. The first control unit 10 includes a first request processing unit 11, a notification unit 12, and a first execution unit 13. The second control unit 20 includes a second request processing unit 21, a storage unit 22, a timer setting unit 23, a notification receiving unit 24, a second execution unit 25, and a power monitoring unit 17. Functional blocks other than the power monitoring unit 17 are the same as those of the information processing apparatus 100 of the first embodiment, and a redundant description thereof will be omitted.

Figure 10:
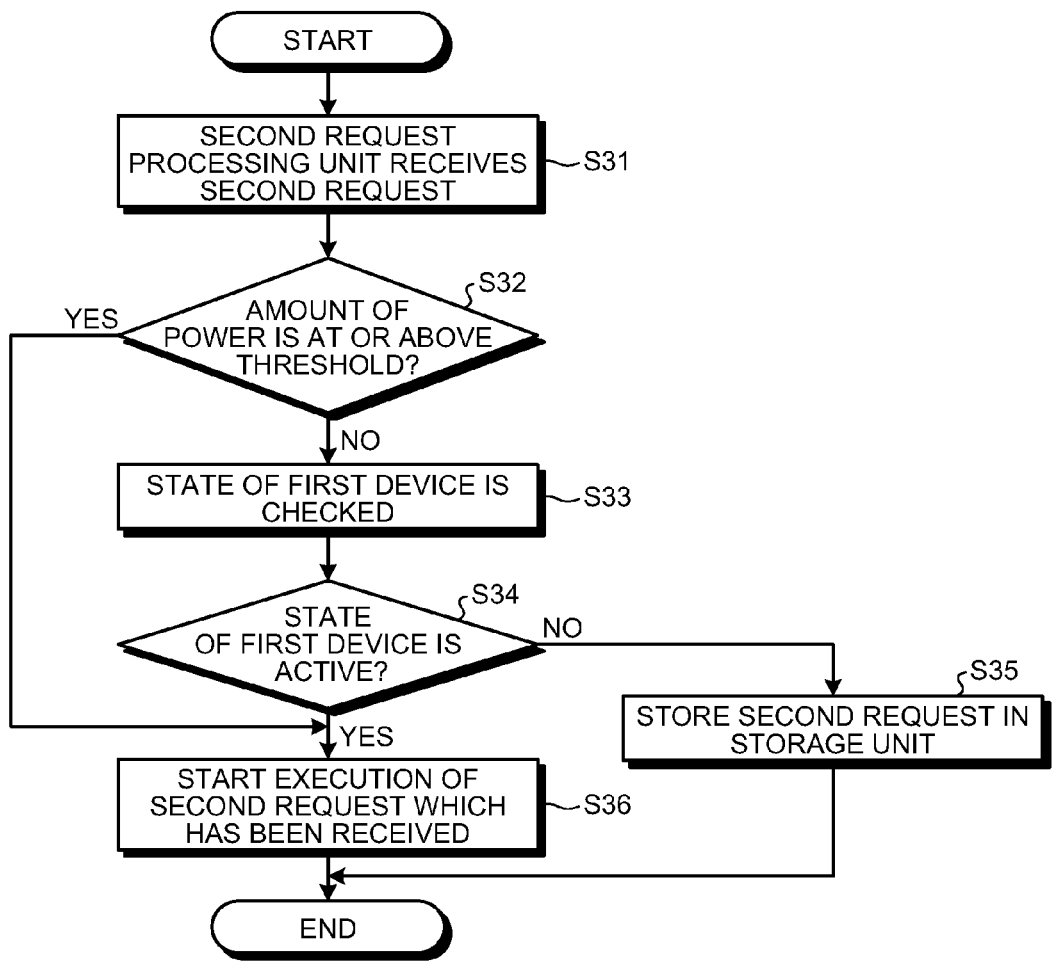
FIG. 10 is a flow chart illustrating an example of an operation of a second control unit of the second embodiment.

The power monitoring unit 17 monitors the amount of power of the power storage device 44. To check the amount of power, the power monitoring unit 17 inquires of the power monitoring unit 17 about the amount of power. The power monitoring unit 17 acquires the amount of power from the power measurement device 38. FIG. 10 is a flow chart for describing an example of an operation of the second control unit 20 of the information processing apparatus 100 of the second embodiment. The second request processing unit 21 receives a second request including an instruction to start a process of the second device 27 (step S31). The power monitoring unit 17 determines whether the amount of power of the information processing apparatus 100 is equal to or larger than a threshold (a predetermined value) (step S32). In the case where the amount of power is equal or larger than the threshold (step S32: Yes), the process proceeds to step S36. In the case where the amount of power is less than the threshold (step S32: No), the second request processing unit 21 (the determination unit 29) checks whether the first device 15 is operating (is in the active state) (step S33). The second request processing unit 21 (the determination unit 29) determines whether the first device 15 is operating (is in the active state) (step S34). In the case where the first device 15 is not in the active state (step S34: No), the storage unit 22 stores the second request (step S35). In the case where the first device 15 is in the active state (step S34: Yes), the second execution unit 25 issues an instruction to the second device controller such that the second device may start execution of the second request (an operation indicated by the second request), and the second device controller causes the second device to start execution of the process (step S36).

According to the information processing apparatus 100 of the present embodiment, the timing of the second device 27 being placed in the active state is made to coincide with the timing of the first device 15 being placed in the active state only when the amount of power stored in the information processing apparatus 100 is less than the threshold. The power saving may thereby be achieved for the information processing apparatus 100, and in the case where there is a sufficient amount of power, the difference in the timing between reception of the request and the start of execution may be made small.

Third Embodiment

Next, an information processing apparatus 100 of a third embodiment will be described. The information processing apparatus 100 of the first embodiment includes one first device 15 and one first device controller. However, the information processing apparatus 100 may include a plurality (an arbitrary number) of first devices 15. The information processing apparatus 100 of the present embodiment includes a plurality of first devices 15.

Figure 11:
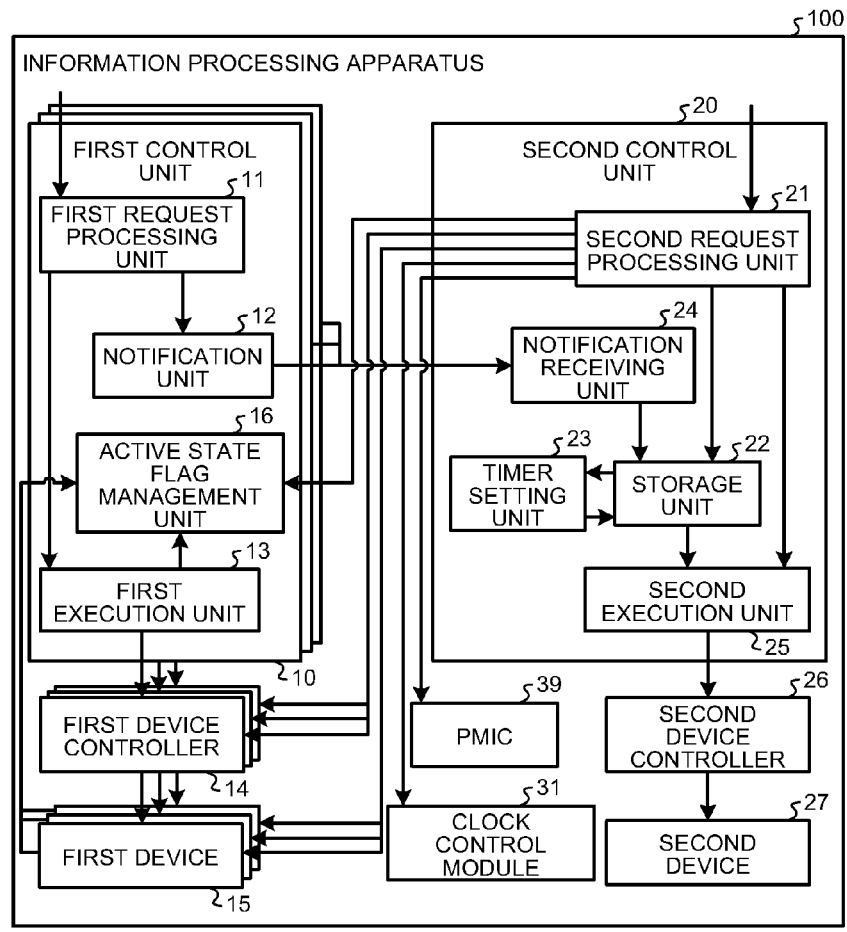
FIG. 11 is a diagram illustrating an example of functional blocks of an information processing apparatus of a third embodiment.

FIG. 11 is a diagram illustrating an example of functional blocks of the information processing apparatus 100 of the third embodiment. The information processing apparatus 100 of the present embodiment includes first control units 10, first device controllers 14, first devices 15, a second control unit 20, a second device controller 26, a second device 27, a PMIC 39, and a clock control module 31. The information processing apparatus 100 of the present embodiment is an example of including three first control units 10, three first device controllers 14, and three first devices 15. The first control unit 10 includes a first request processing unit 11, a notification unit 12, and a first execution unit 13. The second control unit 20 includes a second request processing unit 21, a storage unit 22, a timer setting unit 23, a notification receiving unit 24, and a second execution unit 25. The information processing apparatus 100 of the present embodiment includes three first control units 10, and each one determines the active state of one of the three first devices 15.

A concrete example of the information processing apparatus 100 of the present embodiment will be described. For example, a case where an EPD and a wireless LAN device are made the first devices 15 (the devices to be the reference) will be described. In this case, the first control units 10 are embedded in the device drivers of the reference devices (the EPD and the wireless LAN device). Further, the second control unit 20 is embedded in the device driver of the second device 27 start timing of whose operation is to be coincided with the timing of the reference device being placed in the active state. Accordingly, if, among the plurality of first devices 15, there is even one first device 15 which is in the active state, the second device 27 may start the execution of an operation indicated by the second request.

Figure 12:
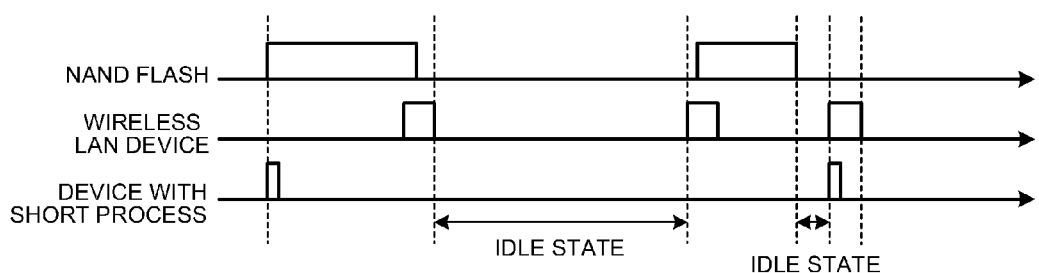
FIG. 12 is a diagram illustrating an example of a device control method of the information processing apparatus of the third embodiment.

Next, an effect of the device control method of the information processing apparatus 100 of the present embodiment will be described. A case where there are two first devices 15 and one second device 27 will be described based on a concrete example. FIG. 12 is an example illustrating an example of a device control method of the information processing apparatus 100 of the third embodiment. The information processing apparatus 100 of the present embodiment (a case of the concrete example of FIG. 12) causes an operation of the second device 27 (a device with a short process) to be started in the case where one of the first devices 15 (a NAND flash and a wireless LAN device) is in the active state. The idle state can thereby be made longer compared to the case of a conventional information processing apparatus 100, and power saving can be achieved for the information processing apparatus 100. That is, the time during which the SoC 30 stays in the idle state with low power consumption or time during which the main memory 40 is placed in the power saving mode or in a power off state can be made longer. Further, the time of supplying power to a device by the PMIC 39 may be made shorter.

Fourth Embodiment

Next, an information processing apparatus 100 of a fourth embodiment will be described. The information processing apparatus 100 may include a plurality (an arbitrary number) of second devices 27. The information processing apparatus 100 of the present embodiment includes a plurality of second devices 27.

According to the information processing apparatus 100 of the present embodiment, the first device 15 is an EPD, and the second devices 27 are a NAND flash and a wireless LAN device. The reason is described below. To coincide the timings of the devices being placed in the active state, a method is desirable of deciding the device to be the reference and coinciding the timing of another device being placed in the active state with the time when the device which is the reference is in the active state. When comparing the average times of the active state, the time of the EPD being in the active state is longer compared to the NAND flash and the wireless LAN device. Further, among the processes using the NAND flash, the write process of the NAND flash is for a page cache on the main memory 40, and a slight delay in the timing does not become a problem. Further, in the case where the main memory 40 is non-volatile, the page cache on the main memory 40 is not lost even when the power is out, and the possibility of occurrence of a problem due to a delay in the writing is further reduced. Further, with respect to the wireless LAN device, since network processing is due to be delayed, delaying the process of the wireless LAN device is hardly a problem.

Accordingly, with the information processing apparatus 100 of the present embodiment, the EPD is desirably made the reference for coinciding the timings of the active state. However, the device to be the reference is not restricted to the EPD. For example, with an information processing apparatus 100 that uses a liquid crystal display, instead of the EPD, as the display device 41, such as a personal computer, the active state of the wireless LAN device and the NAND flash may, in many cases, be relatively longer compared to other devices. In this case, the device to be the reference may be the wireless LAN device or the NAND flash.

Figure 13:
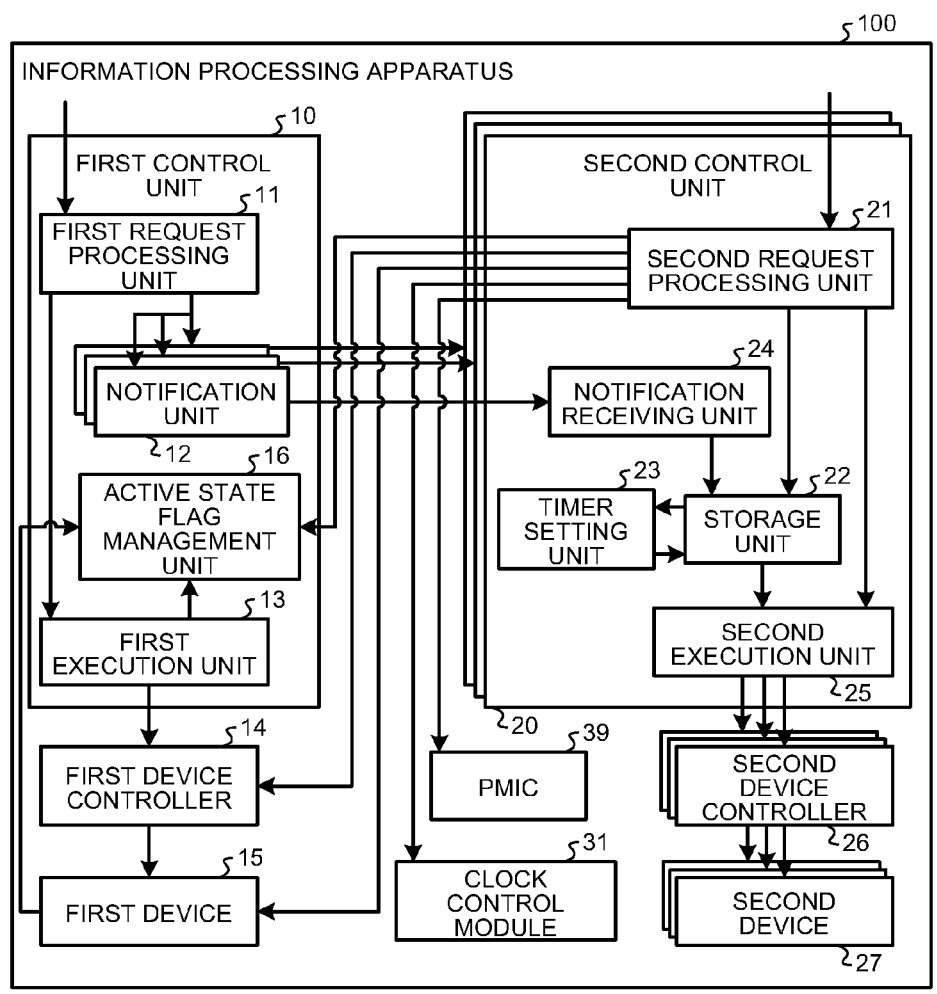
FIG. 13 is a diagram illustrating an example of functional blocks of an information processing apparatus of a fourth embodiment.

FIG. 13 is a diagram illustrating an example of functional blocks of the information processing apparatus 100 of the fourth embodiment. The information processing apparatus 100 of the present embodiment includes a first control unit 10, a first device 15, second control units 20, and second devices 27. The information processing apparatus 100 of the present embodiment is an example of a case where there are three second control units 20, and three second devices 27. The first control unit 10 includes a first request processing unit 11, notification units 12, and a first execution unit 13. The notification units 12 of the present embodiment notify the three second control units 20 (the notification receiving units 24) of reception of a first request. The notification units 12 and the second control units are illustrated in FIG. 13 in such a way as to correspond on a one-to-one basis, but a mode is also allowed according to which one notification unit 12 notifies a plurality of second control units of the reception. The second control unit 20 includes a second request processing unit 21, a storage unit 22, a timer setting unit 23, a notification receiving unit 24, and a second execution unit 25.

Figure 14:
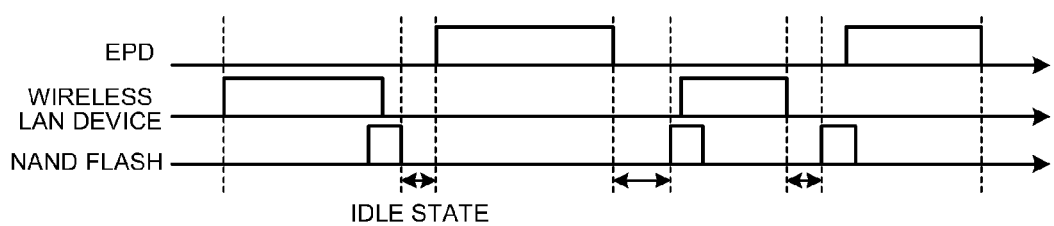
FIG. 14 is a diagram illustrating an example of a device control method of a conventional information processing apparatus.

Next, an effect of the device control method of the information processing apparatus 100 of the present embodiment will be described based on a concrete example with respect to a case where there is one first device 15 and two second devices 27. FIG. 14 is a diagram illustrating an example of the device control method of a conventional information processing apparatus. In FIG. 14, devices are in the active state independently, and the times of the active state rarely overlap. Thus, the period when none of the devices is in the active state is short, and the period when the information processing apparatus 100 is in the idle state is short.

FIG. 15 is a diagram illustrating an example of the device control method of the information processing apparatus 100 of the fourth embodiment. The information processing apparatus 100 of the present embodiment causes operations of the second devices 27 (the NAND flash and the wireless LAN device) to be started in the case where the first device 15 (the EPD) is in the active state. The idle state may thereby be made longer compared to the case of the conventional information processing apparatus 100, and power saving can be achieved for the information processing apparatus 100. That is, the time during which the SoC 30 stays in the idle state with low power consumption or time during which the main memory 40 is placed in the power saving mode or in a power off state can be made longer. Further, the time of supplying power to a device by the PMIC 39 can be made shorter.

According to the information processing apparatus 100 of the present embodiment, the notification units 12 of the first control unit 10 notify respective second devices 27 configuring the information processing apparatus 100 of reception of a first request. Accordingly, the information, processing apparatus 100 of the present embodiment achieves the same effect as the information processing apparatus 100 of the first embodiment even with an arbitrary number of second devices 27.

As described above, according to the information processing apparatuses 100 of the first to fourth embodiments, power saving can be achieved without changing the hardware configurations of the devices of the information processing apparatuses 100.

Devices configuring the information processing apparatuses 100 may be arbitrary devices. A case where a device is a processor will be described as a concrete example of a device not described in the embodiments above.

FIG. 16 is a diagram illustrating an example of a configuration of functional blocks of an information processing apparatus 100 of an example modification of the first embodiment (an example where the second device is a processor). FIG. 16 is different from FIG. 1 in that the second device controller 26 and the second device 27 in FIG. 1 are a processor 46 in FIG. 16. In this case, start of execution of a program to be executed on the processor 46 is to be coincided with the time of the first device being in the active state.

As an example of a concrete process of a program, there is GC (Garbage Collection) to be executed by an application, for example. The GC is a process for releasing a unused memory area, among memory areas allocated by an application. The GC is characteristic in that the processing load is great but the restrictions regarding the timing of start are not restrictive, and a delay in the start timing does not become a great problem. Thus, if the timing of execution of the GC is coincided with the active state of the first device (a device to be the reference) by embedding the second control unit 20 in the application at a part for calling up the GC, power saving may be achieved for the information processing apparatus 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising a first processor configured to operate as:
   a first control unit configured to control a first device; and
   a second control unit configured to control a second device, wherein
   the first control unit includes:
      a first request processing unit configured to receive a first request including an instruction to start a process of the first device;
      a notification unit configured to notify the second control unit of reception of the first request; and
      a first execution unit configured to start a process of the first device based on the first request, and
   the second control unit includes:
      a second request processing unit configured to receive a second request including an instruction to start a process of the second device;
      a storage control unit configured to control a storage unit storing the second request in a case where the first device is not in an active state when the second request processing unit receives the second request;
      a notification receiving unit configured to receive the notification; and
      a second execution unit configured to
         execute the second request received by the second request processing unit in a case where the first device is in the active state, and
         execute the second request stored in the storage unit when the notification is received by the notification receiving unit, wherein
   the second control unit further includes a timer setting unit configured to set a timer at a time when the second request is stored in the storage unit, and
   when the timer expires, the second execution unit executes the second request stored in the storage unit.

2. The apparatus according to claim 1, wherein
   the second control unit further includes a power monitoring unit configured to monitor an amount of power of the information processing apparatus, and
   in a case where the amount of power is equal to or larger than a predetermined value, the second execution unit executes the second request received by the second request processing unit.

3. The apparatus according to claim 1, wherein
   the information processing apparatus includes a plurality of the first control units, and
   the second execution unit
      executes the second request received by the second request processing unit in a case where any one of the first devices is in the active state, and
      executes the second request stored in the storage unit when the notification is received by the notification receiving unit.

4. The apparatus according to claim 1, wherein
   the information processing apparatus includes a plurality of the second control units,
   the notification unit notifies the notification receiving units of the plurality of second control units of the notification, and
   the second execution unit
      executes the second request received by the second request processing unit in a case where the first device is in the active state, and
      executes the second request stored in the storage unit when the notification is received by the notification receiving units.

5. The apparatus according to claim 1, wherein
   the second device is a second processor, and
   the second request is a request instructing start of execution of a program to be executed by the second processor.

6. A device control method performed in an information processing apparatus including a first processor configured to operate as a first control unit configured to control a first device, and a second control unit configured to control a second device, the method comprising:
   receiving, by a first request processing unit of the first control unit, a first request including an instruction to start a process of the first device;
   notifying, by a notification unit of the first control unit, the second control unit of reception of the first request;
   starting, by a first execution unit of the first control unit, a process of the first device based on the first request;
   receiving, by a second request processing unit of the second control unit, a second request including an instruction to start a process of the second device;
   storing, in a storage unit of the second control unit, the second request in a case where the first device is not in an active state;
   receiving the notification by a notification receiving unit of the second control unit;
   executing, by a second execution unit of the second control unit, the second request received by the second request processing unit in a case where the first device is in the active state, and executing, by the second execution unit, the second request stored in the storage unit when the notification is received by the notification receiving unit;
   setting, by a timer setting unit of the second control unit, a timer at a time when the second request is stored in the storage unit; and
   when the timer expires, executing, by the second execution unit, the second request stored in the storage unit.

7. The method according to claim 6, further comprising:
   monitoring, by a power monitoring unit of the second control unit, an amount of power of the information processing apparatus, wherein
   in a case where the amount of power is equal to or larger than a predetermined value, the second request received by the second request processing unit is executed by the second execution unit.

8. The method according to claim 6, wherein
   the information processing apparatus includes a plurality of the first control units, and,
   by the second execution unit,
      the second request received by the second request processing unit is executed in a case where any one of the first devices is in the active state, and
      the second request stored in the storage unit is executed when the notification is received by the notification receiving unit.

9. The method according to claim 6, wherein
   the information processing apparatus includes a plurality of the second control units,
   by the notification unit, the notification is notified to the notification receiving units of the plurality of second control units, and
   by the second execution unit, the second request received by the second request processing unit is executed in a case where the first device is in the active state, and the second request stored in the storage unit is executed when the notification is received by the notification receiving units.

10. The method according to claim 6, wherein
the second device is a second processor, and
the second request is a request instructing start of execution of a program to be executed by the second processor.

11. The method according to claim 6, further comprising:
setting, by a timer setting unit of the second control unit, a timer at a time when the second request is stored in the storage unit, wherein
by the second execution unit, when the timer expires, the second request stored in the storage unit is executed.

12. A computer program product comprising a non-transitory computer-readable medium containing a computer program that causes a computer to function as:
an information processing apparatus comprising a first processor configured to operate as:
a first control unit configured to control a first device; and
a second control unit configured to control a second device, wherein
the first control unit includes:
a first request processing unit configured to receive a first request including an instruction to start a process of the first device;
a notification unit configured to notify the second control unit of reception of the first request; and
a first execution unit configured to start a process of the first device based on the first request, and
the second control unit includes:
a second request processing unit configured to receive a second request including an instruction to start a process of the second device;
a storage control unit configured to control a storage unit storing the second request in a case where the first device is not in an active state;
a notification receiving unit configured to receive the notification; and
a second execution unit configured to
execute the second request received by the second request processing unit in a case where the first device is in the active state, and
execute the second request stored in the storage unit when the notification is received by the notification receiving unit, wherein
the second control unit further includes a timer setting unit configured to set a timer at a time when the second request is stored in the storage unit, and
when the timer expires, the second execution unit executes the second request stored in the storage unit.

13. The product according to claim 12, wherein
the second control unit further includes a power monitoring unit configured to monitor an amount of power of the information processing apparatus, and
in a case where the amount of power is equal to or larger than a predetermined value, the second execution unit executes the second request received by the second request processing unit.

14. The product according to claim 12, wherein
the information processing apparatus includes a plurality of the first control units, and the second execution unit
executes the second request received by the second request processing unit in a case where any one of the first devices is in the active state, and
executes the second request stored in the storage unit when the notification is received by the notification receiving unit.

15. The product according to claim 12, wherein
the information processing apparatus includes a plurality of the second control units,
the notification unit notifies the notification receiving units of the plurality of second control units of the notification, and
the second execution unit
executes the second request received by the second request processing unit in a case where the first device is in the active state, and
executes the second request stored in the storage unit when the notification is received by the notification receiving units.

16. The product according to claim 12, wherein
the second device is a second processor, and
the second request is a request instructing start of execution of a program to be executed by the second processor.

17. The product according to claim 12, wherein
the second control unit further includes a timer setting unit configured to set a timer at a time when the second request is stored in the storage unit, and
when the timer expires, the second execution unit executes the second request stored in the storage unit.

18. An information processing apparatus comprising a processor configured to operate as:
a first control unit configured to control a first device; and
a second control unit configured to control a second device, wherein
the first control unit includes:
a first request processing unit configured to receive a first request including an instruction to start a process of the first device;
a notification unit configured to notify the second control unit of reception of the first request; and
a first execution unit configured to start a process of the first device based on the first request, and
the second control unit includes:
a second request processing unit configured to receive a second request including an instruction to start a process of the second device;
a notification receiving unit configured to receive the notification; and
a second execution unit configured to execute the second request, wherein
in a case where the first device is in an active state when the second request processing unit receives the second request, the second execution unit executes the second request when the second request is received, and
in a case where the first device is not in the active state when the second request processing unit receives the second request, the second execution unit executes the second request after the notification is received, wherein
the second control unit further includes a timer setting unit configured to set a timer at a time when the second request is stored in the storage unit, and when the timer expires, the second execution unit executes the second request stored in the storage unit.

\* \* \* \* \*